United States Patent [19]

Smith et al.

[11] 4,144,551
[45] Mar. 13, 1979

[54] POWER INTERRUPTER DEVICE FOR AN ELECTRICAL DISTRIBUTION SYSTEM

[75] Inventors: David W. Smith, Alexandria; John C. Logrando, Burke, both of Va.

[73] Assignee: Value Engineering Company, Alexandria, Va.

[21] Appl. No.: 759,045

[22] Filed: Jan. 13, 1977

[51] Int. Cl.² ............................................. H02H 3/08
[52] U.S. Cl. ...................................... 361/93; 361/87; 307/31
[58] Field of Search ................................... 361/90-93, 361/98, 101, 42, 87, 44-46, 107, 108, 1, 187; 307/31, 33-35, 38-39, 20, 24; 340/248 A, 248 B, 248 C, 253 A

[56] References Cited

U.S. PATENT DOCUMENTS

| 3,196,316 | 7/1965 | Crom | 361/48 |
| 3,593,035 | 7/1971 | Martens | 361/187 X |
| 3,663,958 | 5/1972 | Crane | 361/90 |
| 3,761,774 | 9/1973 | Laughinghouse et al. | 361/45 |

Primary Examiner—Patrick R. Salce
Attorney, Agent, or Firm—Edmund M. Jaskiewicz

[57] ABSTRACT

An aircraft flight line electrical distribution system has electrical conductors connected to a power source and a plurality of service cables are connected to the conductors at service points. In order to provide electrical services to individual aircraft each service cable is provided with a connector plug for connection to the aircraft and each connector plug has an electronic power interrupter for interrupting power to the aircraft when the power in the service cable is either or both exceeds or falls short of predetermined levels of power. The power interrupter compares a sensed signal in the power line to a preset control signal. The compared signals are supplied to a logic circuit which then maintains a power contactor in the power supply line in the closed position when the sensed signal is at a predetermined reference level with respect to the control signal.

7 Claims, 10 Drawing Figures

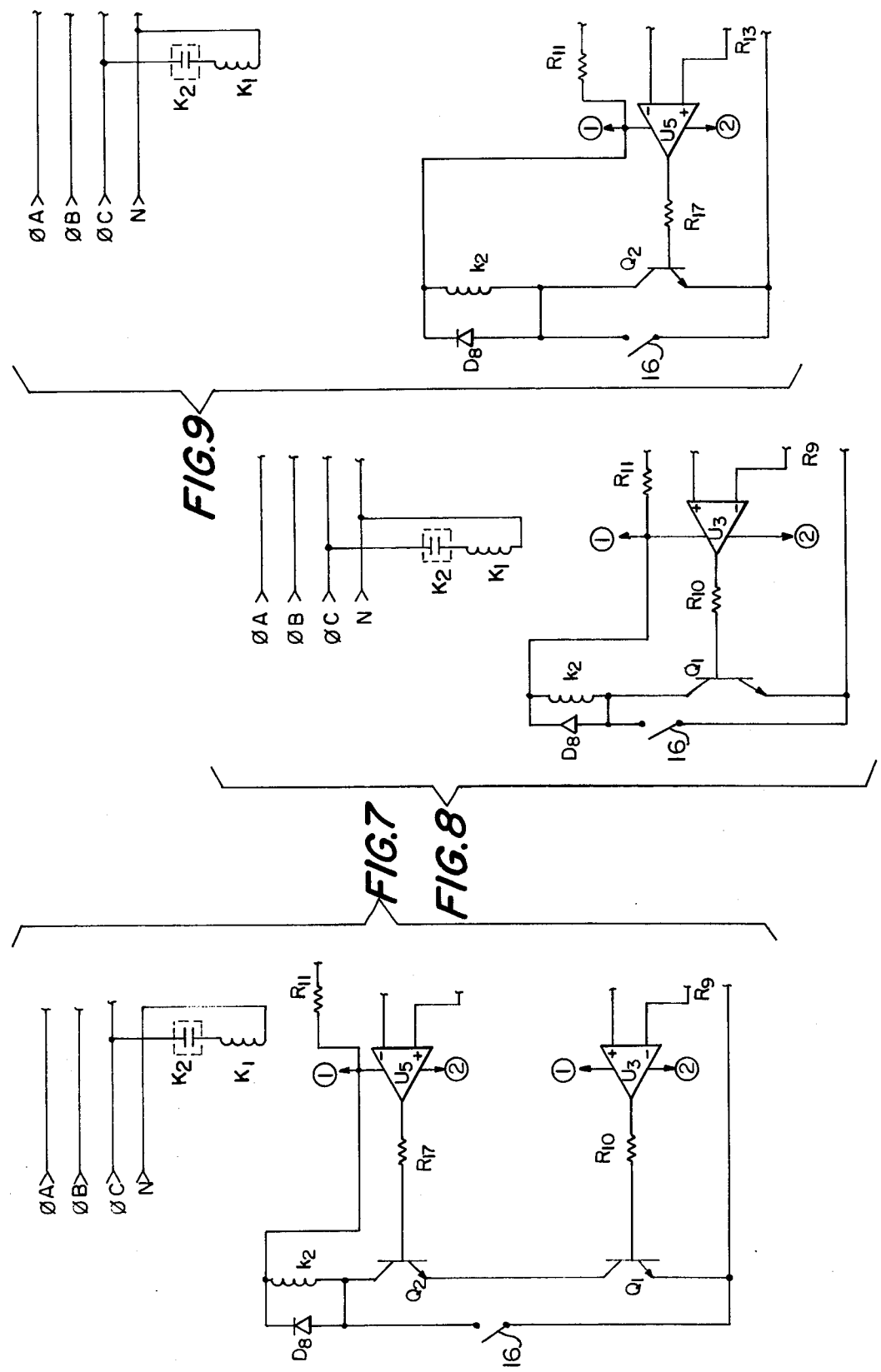

POWER INTERRUPTER DEVICE FOR AN ELECTRICAL DISTRIBUTION SYSTEM

The present invention relates to an aircraft flight line electrical distribution system, more particularly, to a power interrupter device in a connector plug attached to a service cable for an aircraft.

The servicing and starting of aircraft, particularly jet aircraft, on a flight line requires the ready availability of various utilities including electrical energy at various voltages and frequencies for different purposes. It has been proposed to provide an aircraft flight line electrical distribution system wherein a plurality of connector cables are connected to sources of electrical energy at different voltages and frequencies. The connector cables extend along a flight line and are provided with a plurality of spaced service islands each of which has an aircraft service cable and a connector plug assembly. The service islands and the connector cables may be positioned upon the ground and covered with aluminum casting covers in order to allow aircraft to taxi over the system.

The service islands at which the service cables were connected to the interconnector cables were large and heavy structures since each service island not only enclosed the connections between the service cable and the connector cables but also various circuit breakers, instrumentation and controls for the different supplies of electrical energy.

Such an electrical distribution system for aircraft is intended to be readily transportable and to be capable of quick assembly and disassembly at a desired installation. However, the service islands were of a relatively large size and weighed a sufficient amount so that handling and transport ability was difficult with such structures. In addition, the storing of such structures on vehicles in order to facilitate transportation was frequently difficult and time consuming.

It is therefore the principle object of the present invention to provide an improved aircraft flight line electrical distribution system which can be quickly and easily transported and reassembled.

It is another object of the present invention to provide an improved aircraft flight line servicing system which provides electrical power to a multiple number of aircraft along a flight line for ground servicing and start up.

It is an additional object of the present invention to provide such an aircraft flight line electrical distribution system having a service cable connector plug incorporating a power interrupter device.

It is a further object of the present invention to provide a novel and improved power interrupter device for an electrical distribution system.

The objects of the present invention are achieved and the disadvantages of the prior art are eliminated by the aircraft flight line electrical distribution system and connector plug according to the present invention. According to one aspect of the present invention an aircraft flight line electrical distribution system may comprise a plurality of service points spaced along electrical conductors connected to a power source and each service point including service cable. A connector plug is at the end of a service cable to be connected to an aircraft to be serviced. The connector plug is provided with electronic means for interrupting power to the aircraft when the power in the service cable exceeds or falls short of predetermined levels of power.

According to a further object of the present invention a power interrupter device for an electrical distribution system may comprise a normally open power contactor in a power line and having a relay. Start means are connected to the power line and the relay for selectively energizing the coil of the relay to close the power contactor. Means are provided for sensing the current flow in the power line after the power contactor is closed and to provide a sense signal which is then compared with a preset control signal. Means are provided to bypass the start means for maintaining the power contactor in the close position when the sense signal is at a predetermined reference level with respect to the control signal.

Other objects and advantages of the present invention will be apparent upon reference to the accompanying description when taken in conjunction with the following drawings, which are exemplary, wherein;

FIG. 7 is a portion of the left side of the view of FIG. 4 and showing the use of an A.C. coil contactor;

FIG. 8 is a portion of the left side of FIG. 5 and showing the use of an A.C. coil contactor;

FIG. 9 is a portion of the left side of FIG. 6 and showing the use of an A.C. coil contactor.

Proceeding next to the drawings wherein like reference symbols indicate the same parts throughout the various views, a specific embodiment and modification of the present invention will be described in detail.

Figure 1:
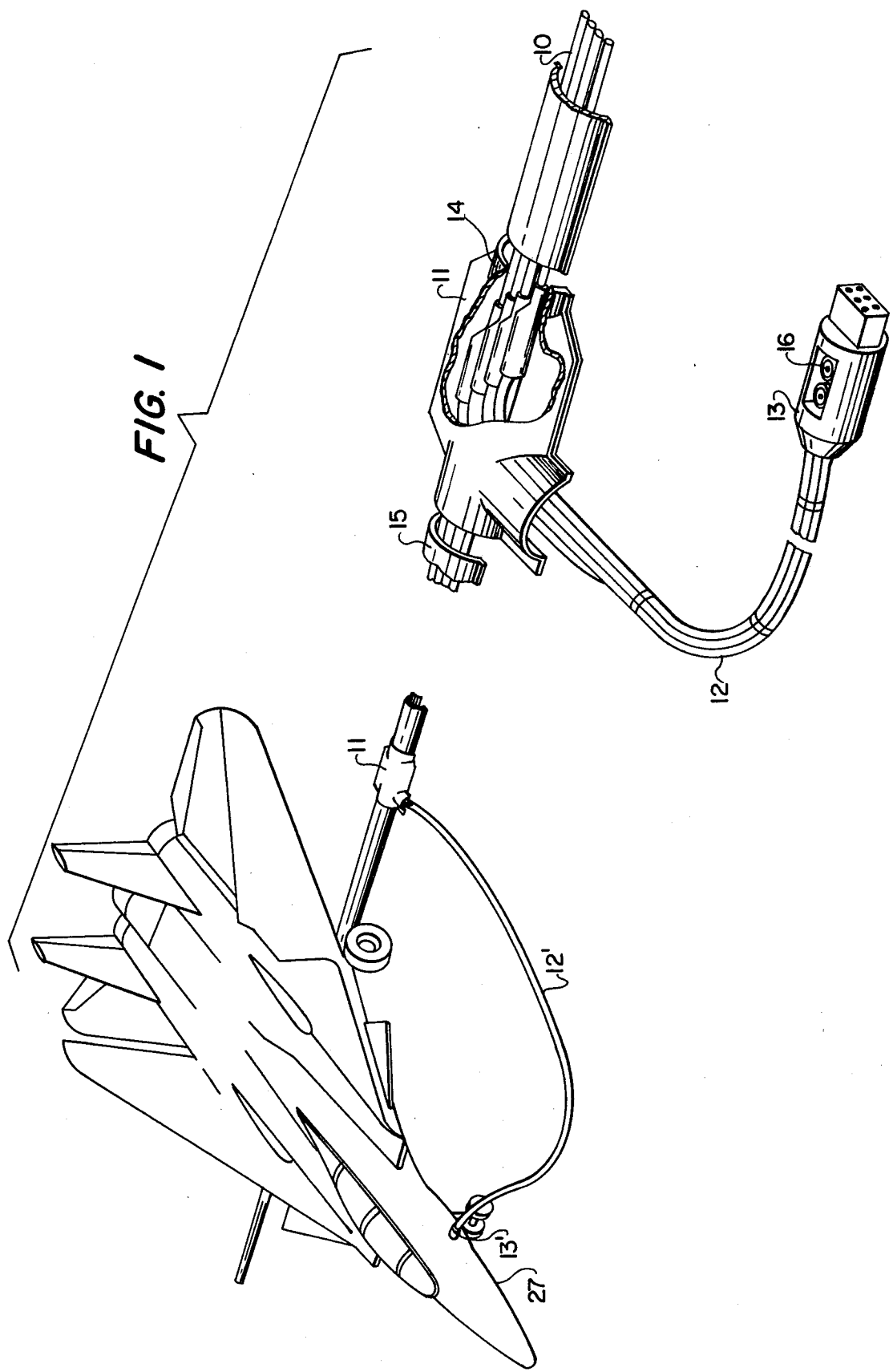
FIG. 1 is an overall perspective view of the aircraft flight line electrical distribution system according to the present invention showing two service points and an aircraft at one of the service points.

As may be seen in FIG. 1, the aircraft flight line electrical distribution system according to the present invention comprises a plurality of interconnector cables 10 which extend along the flight line and are connected to suitable sources of electrical energy to provide various voltages and frequencies of electrical current to be used for different purposes. For example, the present embodiment may be for 115/200 V.A.C., three-phase, 400 HZ. power. Spaced along the interconnector cables is a plurality of service points 11 each of which is provided with a service cable 12 and an aircraft connector plug 13.

The interconnector cables are connected to the service point by detachable electrical connectors as known in the art and in similar manner the cables of the service cable 12 are connected to the service point by connectors. As a result, the service point 11 functions as a junction box since no electrical connections are made within the service point enclosure. All electrical connections are made to corresponding coupler components on the exterior of the service point. The connectors are of the waterproof, quick disconnect type.

The service points 11 and interconnector cables 10 may be covered with aluminum casting covers 14 and 15 to allow aircraft to taxi over the system. The aluminum cover may be of the same type as disclosed in the copending U.S. Pat. application Ser. No. 709,318 filed July 28, 1976 by the same Assignee. The aluminum covers and the enclosure for the service point have such a height and shape to enable aircraft tires to pass readily over these components and the enclosures and covers are provided with suitable tie down or fastening means so as to be secured upon the flight line surface.

For rapid deployment or ease of transportation, all of the electrical components for the distribution system can be readily carried on cargo pallets and then loaded on trucks. The interconnecting power cables and aircraft service cables can be carried on individual cable reels or reels mounted upon a pallet. The three-way service point connector 11 and their tie downs can be readily placed in containers on the same pallet.

The transportability of the electrical distribution system of the present invention is significantly enhanced by incorporating a power interrupter within the aircraft servicing plug 13 and by using the three-way service point connector in place of a metal junction box in which were enclosed terminal boards and circuit breakers.

Figure 2:
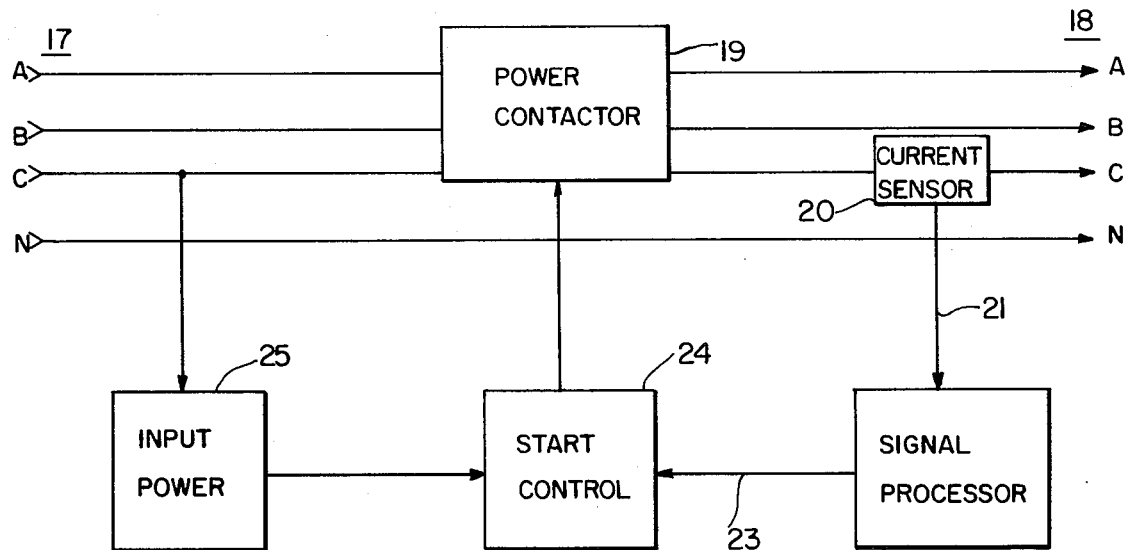
FIG. 2 is a simplified block diagram of the electronic power interrupter of the present invention utilized in the aircraft plug of FIG. 1.
Figure 3:
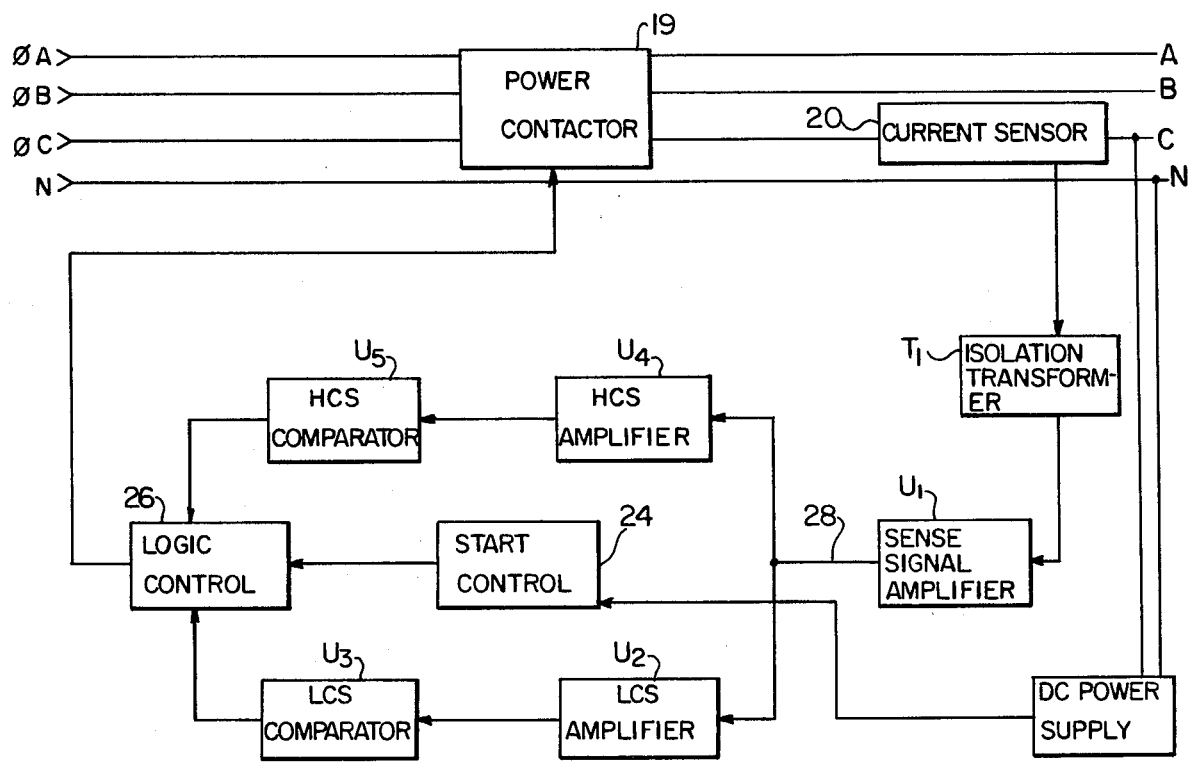
FIG. 3 is a detailed block diagram of the power interrupter of FIG. 2 and utilizing an over and under current sensor.

The power interrupter which is schematically illustrated in FIGS. 2 and 3 permits power servicing to the aircraft at defined current levels. The power to the aircraft will be interrupted if the current level is below the low current sense setting or above the high current sense setting. The purpose of the low level current sense is to interrupt the power at the plug 13 when the plug is not inserted into an aircraft service receptacle as shown in FIG. 1. The plug must be inserted in the aircraft receptacle, a push-to-start button 16 on the plug depressed, and the current level must exceed the low level current sense setting to sustain power at the plug. Thus, plug head power will not remain activated unless the above conditions are met. This eliminates activating power to the plug head before it is inserted in the aircraft. The high current sense interrupts power to the plug head if the current required by the aircraft exceeds the high current sense setting. The concept of high and low current sensing and power interruption can also be applied where it is desired to sense either high or low current levels separately.

In FIGS. 2 and 3 there are shown the components of the power interrupter as enclosed in the aircraft plug 13. The three-phase line is provided with phase lines A, B and C and neutral line N. The ends of the lines at 17 are connected to the service' cable 12 and the ends of the lines at 18 go to the aircraft to be connected to corresponding connectors in the aircraft service receptacle. The interrupter comprises a power contactor 19 which may be of the D.C. coil type connected in series with phases A, B, C and a current sensor 20 which in this embodiment is connected in line C. The current sensor 20 which can be a Hall generator or current transformer provides a low level A.C. voltage signal at 21 proportional to the current flow through the device and the signal is amplified, rectified, and compared to a D.C. reference level in a signal processor stage 22.

A control signal is generated in the signal processor at 22 and sent to a start control 24 by interconnecting wire 23. The control signal is coupled by a logic circuit to the main power contactor 19 which allows or interrupts power at the plug head depending on the current flow level status. Power for the start control 24, current sensor 20, and signal processor 22 is derived from the A.C. input by means of a modular D.C. power supply 25.

In this embodiment, the current sensor 20 is shown in only one line of a three-phase system. However, sensors can be placed in all three lines and the system will function in the same manner. Sensing all three lines will permit detection of a current imbalance in the load.

As may be further seen in FIG. 3, the signal processor stage 22 comprises an isolation transformer $T_1$ to which is connected a sense signal amplifier $U_1$. Connected to the output of the sense signal amplifier is a high current sense amplifier $U_4$ and a low current sense amplifier $U_2$. Connected to the outputs of these amplifiers is a high current sense comparator $U_5$ and a low current sense comparator $U_3$ with their outputs being connected to a logic control 26.

Figure 4:
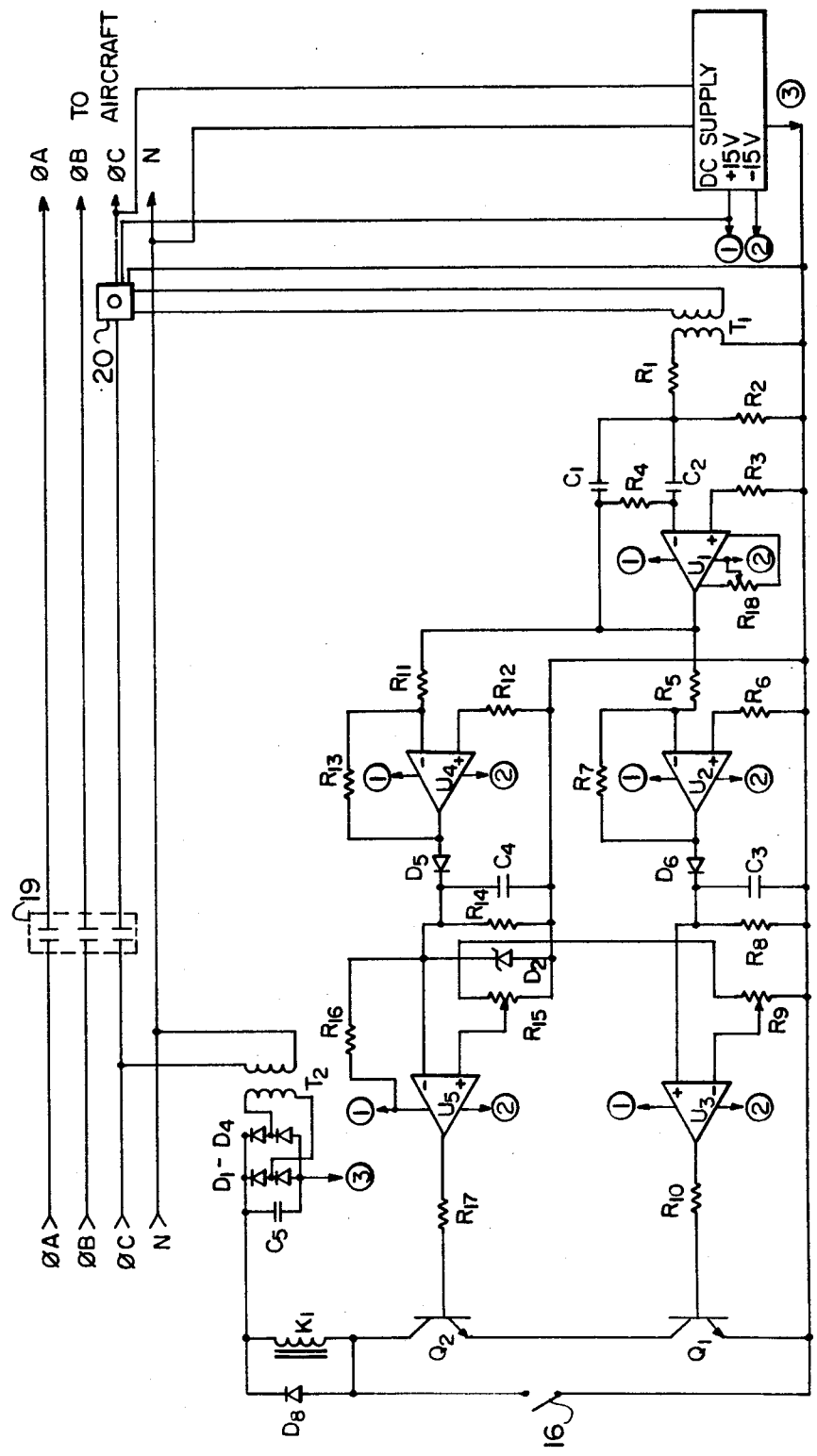
FIG. 4 is a schematic view showing the electrical circuit of the under and over current sensor power interrupter of FIG. 3 using a Hall generator as a current sensor.

Referring next to the detailed circuit description in FIG. 4, initially, the contactor 19 which has a D.C. coil k1 is in the open state and transistors Q1 and Q2 are biased in the off state. The 115 VAC input power is tapped from phase C to neutral and reduced 20 volts A.C. rms through transformer T2. The 20-volt VAC rms is then rectified through diodes D1-D4 and filtered through capacitor C5 to provide approximately a twenty-eight VDC level to drive the power contactor relay coil k1. Diode D8 reduces transient suppression when the relay changes from the close to the open state. Initially, no power is present at the aircraft side of the plug 18 in FIG. 2 since the power contactor 19 is in the open state. Power to all of the electronic components except the power contactor is provided by the modular DC power supply 25 connected between Phase C and neutral on the aircraft side of the power contactor 19. Power is not present in these circuits when the power contactor is in the open state.

In order to initiate power to the plug head, the plug 13 must be inserted into an aircraft service receptacle as shown with aircraft 27 in FIG. 1. This will provide a current load from Phase C to neutral. The push-to-start button 16 is depressed which bypasses transistors Q1 and Q2 and energizes the relay coil k1 to close the power contactor 19. Power is now coupled to the aircraft 27 and current begins to flow through the current sensor 20. At the same time, power is applied to the DC supply 25 and all other electronic circuits of the interrupter as shown in FIGS. 3 and 4 become activated. The current sensor 20 will generate an A.C. voltage signal proportional to and at the same frequency as the current flowing through the interrupter device. The amplitude of this signal is 1.0 millivolt for each ampere of current flowing through the interrupter.

The A.C. signal at 21 is coupled through isolation transformer T1 to the inverting input of the first amplifier stage U1. Resistors R1, R2 and R4 are provided to set the A.C. gain level of amplifier U1 to 100. Resistor R3 is provided for temperature compensation and resistor R18 is the D.C. offset null adjustment. Capacitors C1 and C2 in combination with resistors R1, R2 and R4 provide a 400 H.Z. bandpass filter to eliminate random noise from being amplified.

The output at 28 of amplifier U1 is coupled to the input of low current sense amplifier U2 and to the high current sense amplifier U4. Resistors R5 and R7 are provided to set the voltage gain of amplifier U2 to 27. Resistor R6 provides for temperature compensation in amplifier U2. The high current sense amplifier voltage gain is set at 3 by resistors R13 and R11. Resistor R12 provides temperature compensation in amplifier U4.

The amplified A.C. signal from amplifier U2 is rectified through diode D6 and filtered through capacitor C3 and resistor R8 to produce a D.C. level. The amplified A.C. signal from amplifier U4 is rectified through diode D5 and filtered through capacitor C4 and resistor R14 to produce a D.C. level.

A low current sense comparator U3 compares the low current sense D.C. level to a preset reference level provided by Zener diode $D_2$ and variable resistor R9. If the D.C. level of the sense signal is greater than the reference D.C. voltage, the output of the low current sense comparator U3 assumes the high state +15 volts. If the D.C. level of the sense signal is less than the reference D.C. voltage, the low current sense comparator U3 will assume the low state −15 volts. Transistor Q1 will be forward biased only when the comparator U3 is in the high state. Resistor R10 provides current limiting to the base of the transistor Q1.

The operation of the high current sense comparator U5 is opposite from that of the low current sense comparator U3 in that its output assumes the low state −15 volts if the high current sense D.C. sense voltage is greater than the reference D.C. voltage provided by diode D2 and resistor R15. The high current sense comparator U5 assumes the high state plus 15 volts only when the high current sense D.C. sense level is less than the D.C. reference level. In that condition, transistor Q2 will be forward biased into conduction. Resistor R17 provides current limiting to the base of transistor Q2.

In order to maintain power through the plug to the aircraft, both transistors Q1 and Q2 must be in the ON state when the button 16 is released. Transistors Q1 and Q2 form a series path to complete the conduction path for the power contactor 19 relay coil k1 to maintain the contactor in the energized state.

The over and under current sensor power interrupter as disclosed in FIG. 4 may be modified to utilize an A.C. coil driven relay k1 for the power contactor 19 as shown in FIG. 7. A second relay K2 is added to provide control coupling to the power contactor.

Figure 5:
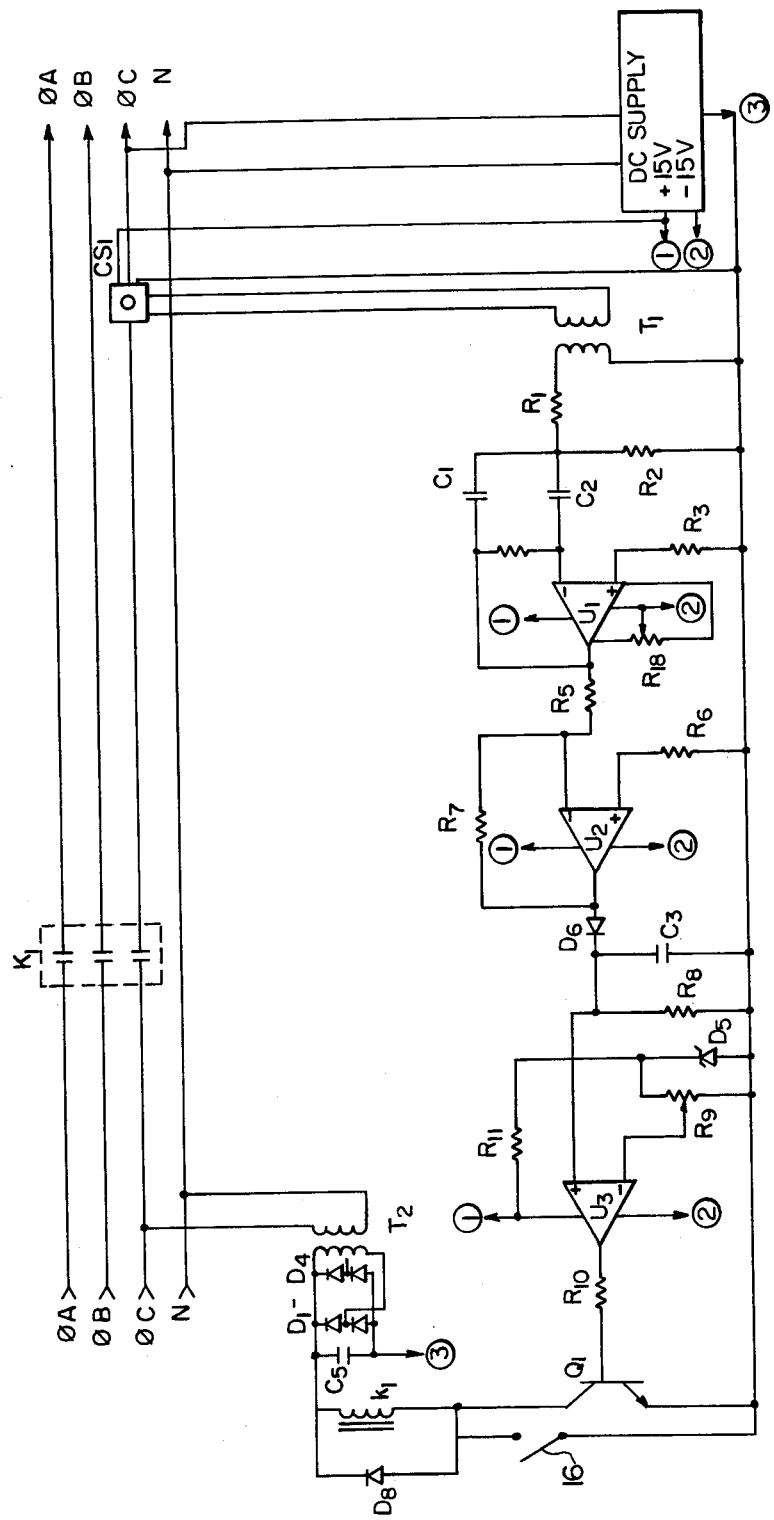
FIG. 5 is a view similar to that of FIG. 4 but wherein the power interrupter has an under current sensor.

In FIG. 5 there is shown the circuit for an undercurrent sensor power interrupter using a D.C. coil contactor as disclosed in FIG. 4. The circuit of FIG. 5 can also be modified to use an A.C. coil contactor as shown in FIG. 8.

Figure 6:
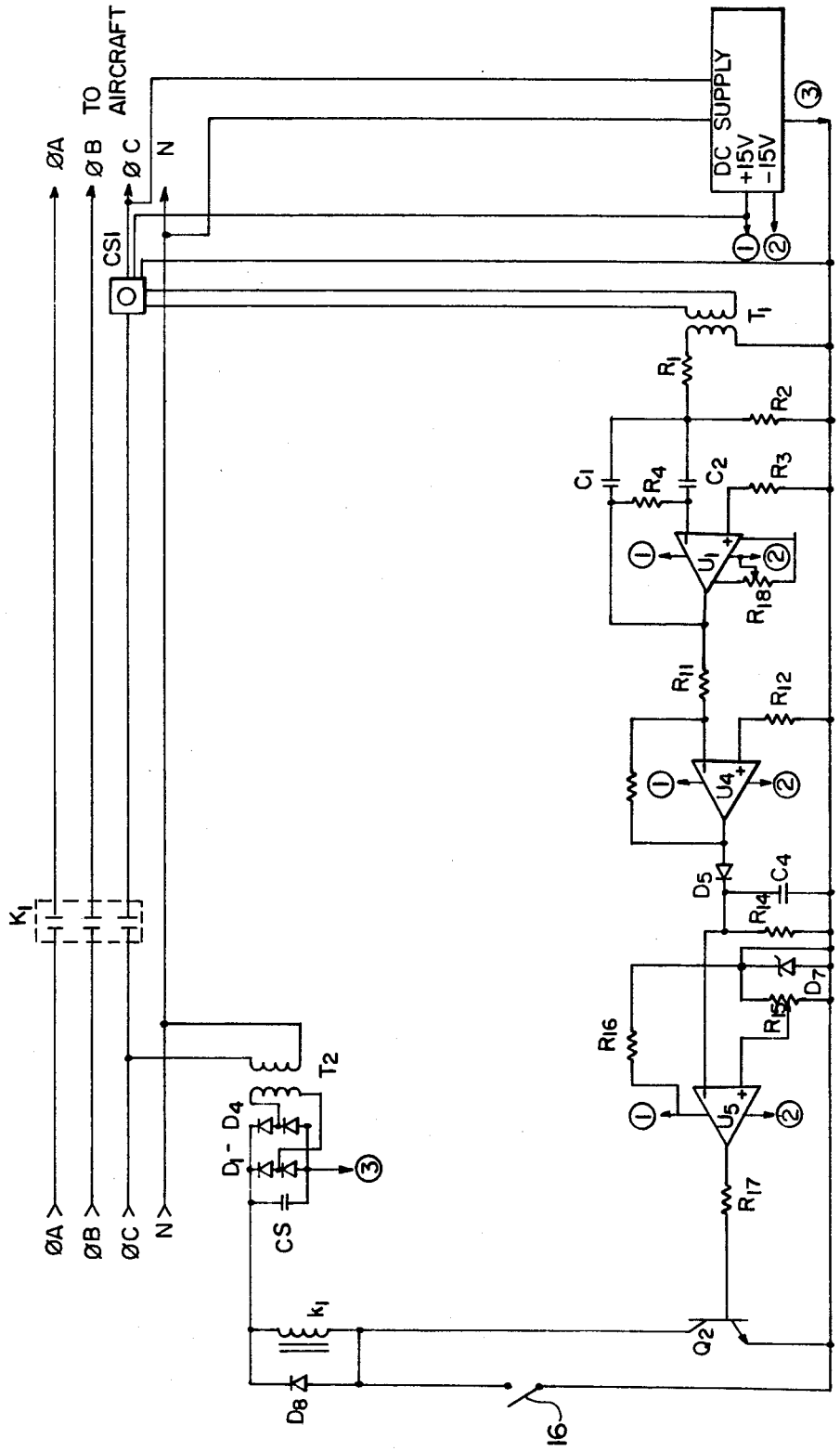
FIG. 6 is a view similar to that of FIG. 4 but wherein the power interrupter has an over current sensor.
Figure 10:
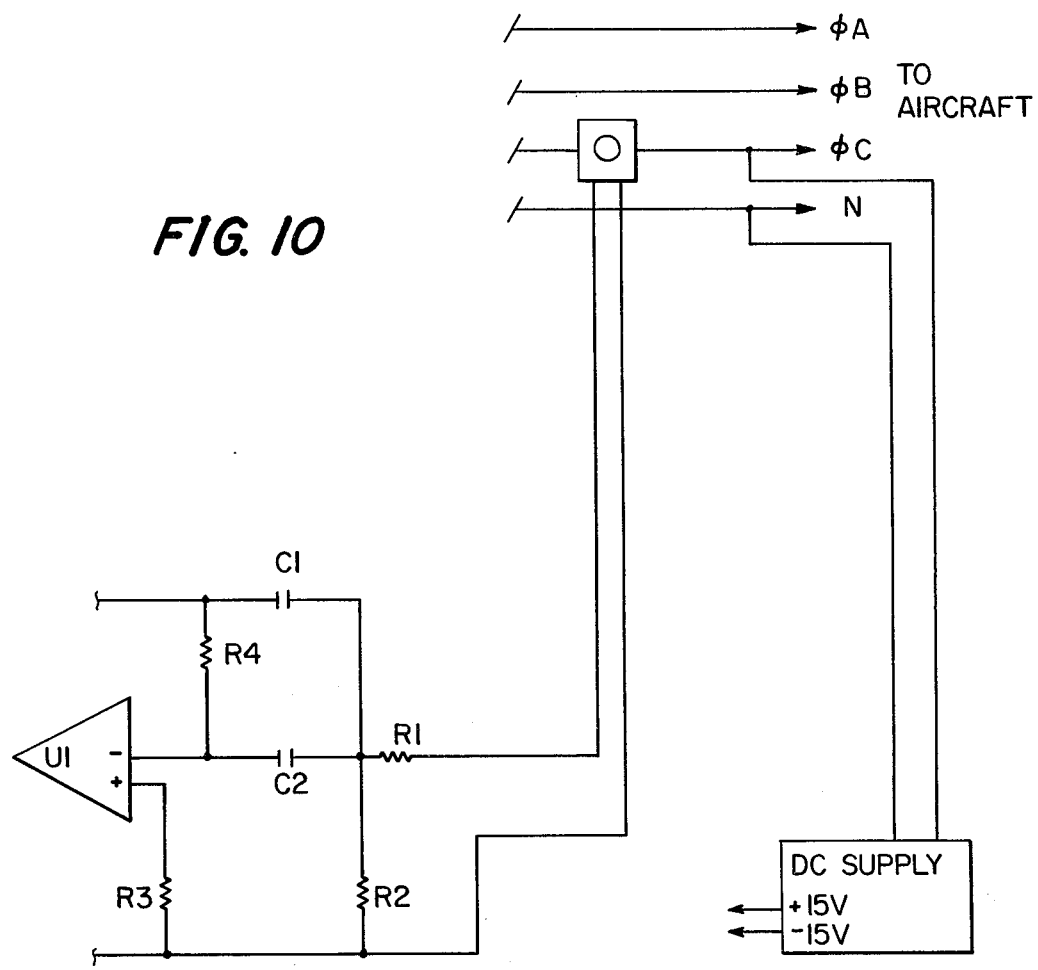
FIG. 10 is a portion of the right side of FIG. 4 and showing the use of a current transformer for sensing.

In FIG. 6 there is illustrated the circuit for an over current sensor power interrupter using a D.C. coil contactor and this circuit also may be modified to use an A.C. coil contactor as shown in FIG. 9.

The component values for the embodiment as disclosed in FIG. 4 are shown in Table 1.

TABLE 1

| Resistors | | |
|---|---|---|
| | R1 | 2.7KΩ |
| | R2 | 10KΩ |
| | R3 | 1.0MΩ |
| | R4 | 560Ω |
| | R5 | 1KΩ |
| | R6 | 910Ω |
| | R7 | 27KΩ |
| | R8 | 1KΩ |

TABLE 1-continued

| | | |
|---|---|---|
| | R9 | 1KΩ |
| | R10 | 130Ω |
| | R11 | 1KΩ |
| | R12 | 750Ω |
| | R13 | 3KΩ |
| | R14 | 30KΩ |
| | R15 | 1KΩ |
| | R16 | 200Ω |
| | R17 | 130Ω |
| | R18 | 5KΩ |
| Capacitors | | |
| | C1 & C2 | .01μf |
| | C3 - C5 | 150μf |

While the power interrupter of the present invention has been described as utilized in aircraft servicing it is to be noted that the concept of over and under current sensing and power interruption can be utilized in other electrical distribution systems, such as, for example, industrial control and power distribution monitoring, commercial safety devices, and military power monitoring such as motor generator sets and power distribution systems.

Thus it can be seen that the present invention has disclosed a power interrupter device for the distribution of power and particularly for an electrical distribution system for an aircraft flight line. The small size and compactness of the power interrupter enables the device to be readily accommodated within an aircraft servicing plug. The device has been disclosed for particularly use with a circuit of 400 HZ. but may be used at other frequencies and voltages.

The power interrupter device is actuated by pressing down the button upon the plug being connected. The button is held down for a short period of time and then released. If current is drawn by the aircraft above or below the high or low current level limits then the device will interrupt the flow of power. For particular applications, the device can be used to sense only low current levels or high current levels. Further, either D.C. or A.C. may be used for the relay coil circuit.

It will be understood that this invention is susceptible to modification in order to adapt it to different usages and conditions, and accordingly, it is desired to comprehend such modifications within this invention as may fall within the scope of appended claims.

What is claimed is:

1. A power interrupter device for an electrical distribution system comprising a normally opened power contactor in a power line in the device and having a relay, start means connected to said power line and said relay for selectively energizing the coil of the relay to close the power contactor, means for sensing the current flow in the power line after the power contactor is closed to provide a signal proportional to the current flow through the device, means for generating a preset control signal, means for comparing the sense signal to said control signal, means bypassing said start means for maintaining said power contactor in the closed position when the sense signal is at a predetermined reference level with respect to said control signal, a first amplifier connected to said sensing means to amplify the sense signal and having an output, a second high current sense amplifier and a third low current sense amplifier both connected to the output of said first amplifier, a first high current sense comparator connected to said second amplifier and a second low current sense comparator connected to said third amplifier, said control signal generating means supplying a high reference voltage to said first comparator and supplying a low reference voltage to said second comparator, and means connected to the outputs of said first and second comparators for completing a conduction path to said power contactor when the high sense signal level is less than said high reference voltage and when the low sense signal level is greater than the lower reference voltage.

2. A power interrupter device as claimed in claim 1 and an aircraft service cable connector plug and said power line being within said plug, said start means comprising a push button on said plug.

3. A power interrupter device as claimed in claim 1 wherein said power contactor is connected between inlet and outlet sides of said device, said current sensing means connected between said power contactor and said outlet side.

4. A power interrupter device as claimed in claim 1 wherein said power line comprises a three-phase system, said current sensing means connected in a single line of said power line.

5. A power interrupter device as claimed in claim 4 wherein said current sensing means is connected in all lines of said three-phase power line.

6. A power interrupter device as claimed in claim 3 and further comprising a power supply connected to said power line between said power contactor and said outlet side.

7. A power interrupter device as claimed in claim 1 wherein said relay coil comprises one of an A.C. coil and D.C. coil.

* * * * *